US008411628B2

(12) United States Patent
Eronen et al.

(10) Patent No.: US 8,411,628 B2
(45) Date of Patent: Apr. 2, 2013

(54) REDUCING KEEP-ALIVE MESSAGES IN CONNECTION WITH ELEMENT TRAVERSAL BY RELAY MECHANISM

(75) Inventors: Pasi Eronen, Helsinki (FI); Hannes Tschofenig, Espoo (FI)

(73) Assignee: Nokia Siemens Networks Oy, Espoo (FI)

( * ) Notice: Subject to any disclaimer, the term of this patent is extended or adjusted under 35 U.S.C. 154(b) by 341 days.

(21) Appl. No.: 12/663,893

(22) PCT Filed: Jun. 4, 2008

(86) PCT No.: PCT/EP2008/056927
§ 371 (c)(1),
(2), (4) Date: Feb. 18, 2010

(87) PCT Pub. No.: WO2008/151973
PCT Pub. Date: Dec. 18, 2008

(65) Prior Publication Data
US 2010/0157926 A1   Jun. 24, 2010

(30) Foreign Application Priority Data
Jun. 14, 2007   (EP) ..................................... 07110314

(51) Int. Cl.
*H04W 4/00*   (2009.01)

(52) U.S. Cl. ...................................................... 370/329

(58) Field of Classification Search .................. 370/329, 370/341, 431, 437; 455/450–464, 509
See application file for complete search history.

(56) References Cited

U.S. PATENT DOCUMENTS

| | | | |
|---|---|---|---|
| 2004/0120294 A1* | 6/2004 | Yang et al. | 370/338 |
| 2005/0041599 A1* | 2/2005 | Zavalkovsky et al. | 370/252 |
| 2005/0201304 A1* | 9/2005 | Olshansky | 370/282 |
| 2007/0011731 A1* | 1/2007 | Le et al. | 726/11 |
| 2007/0019545 A1* | 1/2007 | Alt et al. | 370/230 |
| 2007/0140159 A1 | 6/2007 | Eronen | |
| 2007/0243872 A1* | 10/2007 | Gallagher et al. | 455/436 |

FOREIGN PATENT DOCUMENTS

| | | |
|---|---|---|
| EP | 1434406 | 6/2004 |
| EP | 1798890 | 6/2007 |

OTHER PUBLICATIONS

Haverinen et al., Energy Consumption of Always-On Applications in WCDMA Networks, IEEE Xplore, 2007, pp. 964-968.
Pasi Eronen, IKEv2 Mobility and Multihoming Protocol (MOBIKE), 4555 Category, Jun. 2006.
Prakash Iyer et al., InternetGatewayDevice: 1 Device Template Version 1.01, Nov. 12, 2001, pp. 1-16.

(Continued)

*Primary Examiner* — Mark Rinehart
*Assistant Examiner* — Mang Yeung
(74) *Attorney, Agent, or Firm* — Squire Sanders (US) LLP

(57) ABSTRACT

A network element, method and computer program product enable to reduce the need to send keep-alive messages when elements have to be traversed. Specifically, a network element comprises a port allocation request unit configured to request from a server over the transmission control protocol the allocation of a user datagram protocol port having a destination determined to take care of traffic for the network element. The network element further comprises a registration unit configured to create a message for requesting internet protocol registration and to send the message over the transmission control protocol.

22 Claims, 1 Drawing Sheet

OTHER PUBLICATIONS

C. Kaufman, Internet Key Exchange (IKEv2) Protocol, 4306 Category, Dec. 2005.
C. Kaufman, Internet Key Exchange (IKEv2) Protocol, May 29, 2004.
C. Perkins, IP Mobility Support for IPv4, Category 3344, Aug. 2002.
M. Stiemerling t al., Middlebox Communications (MIDCOM) Protocol Semantics, Category 3989, Feb. 2005.
H. Levkowetz et al., Mobile IP Traversal of Network Address Translation (NAT) Devices, Category 3519, Apr. 2003.
M. Stiemerling et al., NAT/Firewall NSIS Signaling Layer protocol (NSLP), Mar. 5, 2007.
M. Stiemerling et al., NEC's Simple Middlebox Configuration (SIMCO) Protocol Version 3.0, Category 4540, May 2006.
J. Rosenberg et al., Obtaining Relay Addresses from Simple Traversal Underneath NAT (STUN), Mar. 4, 2007.
A. Huttunen et al., UDP Encapsulation of IPsec ESP Packets, Category 3948, Jan. 2005.

* cited by examiner

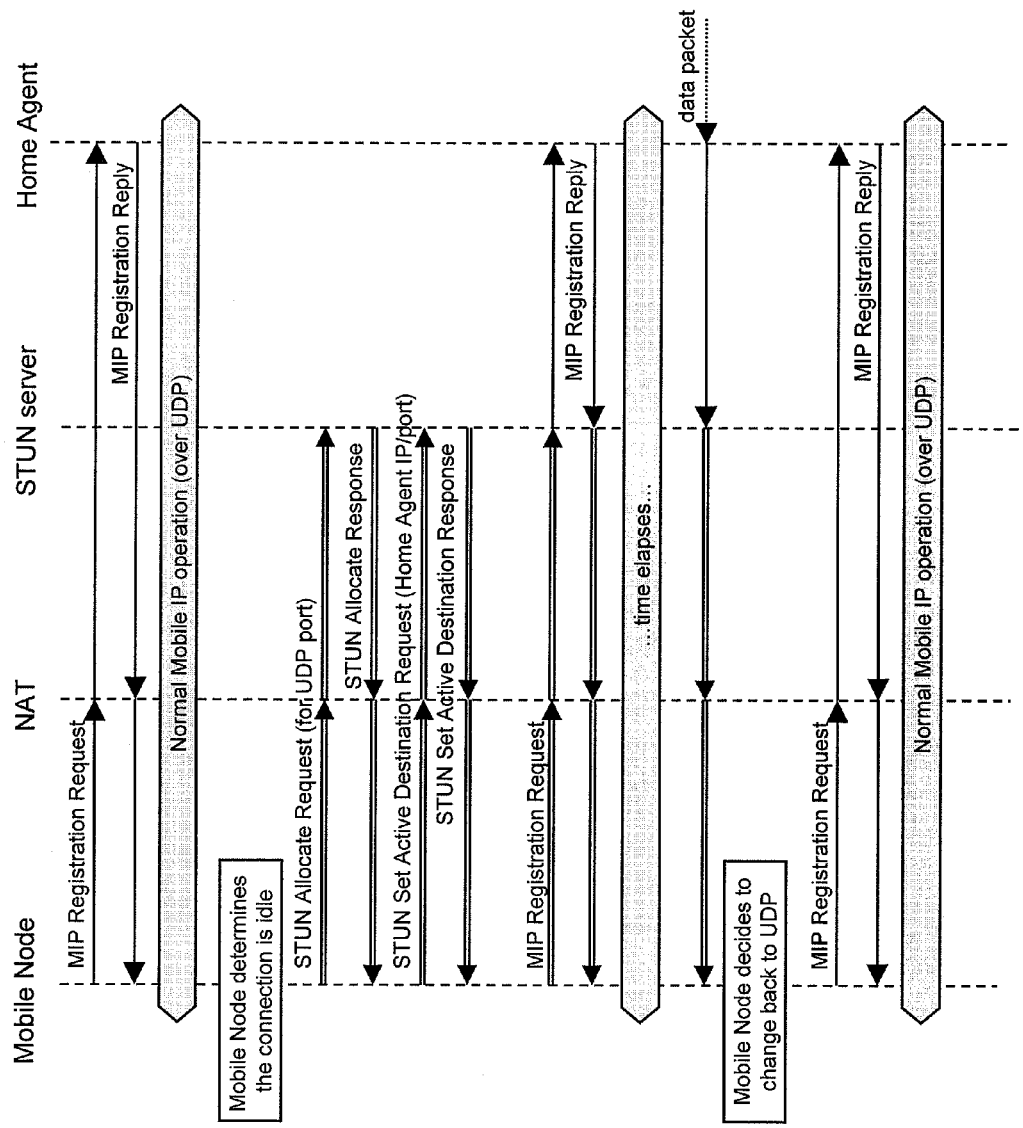

REDUCING KEEP-ALIVE MESSAGES IN CONNECTION WITH ELEMENT TRAVERSAL BY RELAY MECHANISM

The present invention relates to a network element, a method and a computer program product which are able to reduce the need to send keep-alive messages when elements have to be traversed. The present invention is considered to be particularly applicable to Mobile IP and IPsec operation in the presence of Network Address Translators (NATs) and stateful packet filtering firewalls.

In Mobile IPv4 (Mobile Internet Protocol version 4) NAT Traversal which is described in document RFC3519 of the Internet Engineering Task Force (IETF), packets between a mobile node and the home agent are tunneled over the user datagram protocol (UDP) instead of IP-in-IP/GRE (Generic Routing Encapsulation) to get through NATs.

When the mobile node behind the NAT sends the first UDP packet, the NAT device translates it (changes source IP address and port), and stores the state needed for translating packets in the other direction, where the NAT will have to change the destination IP address and port to the correct values. The NAT device will delete the session state if no packets have been sent for some time. If this happens, any packets from the home agent to the mobile node will be dropped by the NAT.

To prevent the NAT from deleting the state, the mobile node must send some packets regularly. Document RFC3519 of the IETF specifies that "A keep-alive packet SHOULD be sent if Keepalive Interval seconds have elapsed without any signaling or data traffic being sent". These "keep-alive" messages reset the timers in the NAT. Typically the keepalive interval would be 20 . . . 60 seconds.

In environments where IPv4 and IPv6 (Internet Protocol version 6) co-exist, as presently considered in working groups of the IETF, traversal of a IPv4/IPv6 translation device that behaves similar to a NAT requires UDP encapsulation so that the described solution is applicable.

Similarly, according to document RFC3948 of the IETF, in IPsec (Secure Internet Protocol) NAT traversal IPsec ESP (IP Encapsulating Security Protocol) packets are tunneled over UDP between the VPN (Virtual Private Network) client and the VPN gateway. Similar keep-alive mechanisms are also specified.

Stateful packet filtering firewalls behave in a similar way as NATs with the notable difference that they do not change any IP address or port information. Still, they create state based on outbound packets that is later matched against inbound packets. In the following, reference is mainly made to NATs. However, the statements equally apply to stateful packet-filtering firewalls.

In small mobile devices, sending keep-alive messages every 20 . . . 60 seconds can consume large amounts of power, thus reducing the battery lifetime.

Haverinen et al. (Henry Haverinen, Jonne Siren, and Pasi Eronen: "Energy Consumption of Always-On Applications in WCDMA Networks" In Proceedings of the 65th Semi-Annual IEEE Vehicular Technology Conference (VTC 2007 Spring), April 2007) have shown that in, for example, 3GPP WCDMA networks, these keep-alive messages can easily reduce the stand-by time by 50% or more.

To solve this problem, in some cases, it may be acceptable to simply shut down the connection to the home agent/VPN gateway, and open it again when needed. Obviously, this does not work if the mobile node/VPN client needs to be reachable all the time for e.g. incoming VoIP (Voice over IP) calls, emails, or IM (Instant Messaging) messages.

Further, it may be possible to configure a larger timeout value in the NAT device. However, the NAT device is often beyond the control of the user of the mobile node/VPN client. Furthermore, there is no reliable way for the mobile node/VPN client to determine what timeout value the NAT is using.

The Mobile Node/VPN client could use some kind of "middlebox signaling protocol" to talk to the NAT device and set a longer timeout, such as disclosed by M. Stiemerling et al.: "NAT/Firewall NSIS Signaling Layer Protocol (NSLP)", work in progress, IETF Internet-Draft draft-ietf-nsis-nslp-natfw-14, March 2007; UPnP Forum, "Internet Gateway Device (IGD) Standardized Device Control Protocol V 1.0", November 2001; M. Stiemerling, J. Quittek, C. Cadar, "NEC's Simple Middlebox Configuration (SIMCO) Protocol Version 3.0", RFC 4540, May 2006; and M. Stiemerling, J. Quittek, T. Taylor, "Middlebox Communications (MIDCOM) Protocol Semantics", RFC 3989, February 2005. Unfortunately, current NAT boxes do not usually support these protocols.

Some vendors are known to use proprietary NAT traversal mechanisms that tunnel everything over TCP (transmission control protocol) instead of using UDP. Typically, the timeout values for established TCP connections are much larger than for UDP (e.g. 15 . . . 60 minutes), so fewer keep-alive packets are needed. However, tunneling IP over TCP can lead to poor performance, especially for real-time applications such as VoIP.

According to an EP application of the applicant filed on Dec. 15, 2005 with the application number 05027537.9 (US filing Aug. 24, 2006: Ser. No. 11/508,818, PCT filing Dec. 13, 2006: PCT/IB2006/003594), there is proposed a mechanism called "TCP Wake-Up", that uses UDP for most data traffic, but avoids sending UDP keep-alive messages during idle periods. The internal prior art describes three different implementation examples:

The first implementation example sets up a separate TCP-based channel between the mobile node/VPN client and home agent/VPN gateway. When the connection is idle, the mobile node/VPN client stops sending UDP keep-alive (and thus the connection state in the NAT will expire). When the home agent/VPN gateway receives a packet destined to the mobile node/VPN client, it will use the TCP-based channel to "wake up" the client. When woken up, the client will re-establish the UDP-based tunnel. All normal data packets are tunneled over UDP. The use of TCP-based "wake-up channel" is negotiated using extensions to Mobile IP and IPsec/IKE (Internet Key Exchange) signaling.

In the second implementation example, the NAT traversal mechanism between the mobile node/VPN client and home agent/VPN gateway dynamically adapts to traffic patterns: when the connection is mostly idle, tunneling over TCP is used; when there is lot of traffic or traffic with real-time requirements, UDP is used. Switching between these two modes is done using extensions to Mobile IP and IPsec/IKE signaling.

The third implementation example introduces a separate notification agent. The TCP connection is created between the mobile node/VPN client and the notification agent. Mobile IP and IPsec/IKE signaling are not modified; instead, the notification agent observes the signaling transparently, and the mobile node/VPN client is notified when needed. In this case, the notification agent has to be placed in "front" of the home agent/VPN gateway so that it can see all the signaling messages.

Thus, it is an object of the present invention to improve the prior art and to avoid the shortcomings described above.

According to a first aspect of the present invention, this is accomplished by a network element, comprising a port allocation request unit configured to request from a server over the transmission control protocol the allocation of a user datagram protocol port having a destination determined to take care of traffic for the network element; and a registration unit configured to create a message for requesting internet protocol registration and to send the message over the transmission control protocol.

Advantageous modifications of the first aspect may be as follows.

The port allocation request unit may be further configured to request the allocation of a user datagram protocol port over the transmission control protocol from a simple traversal underneath network address translators server, to receive a user datagram protocol port allocation response from the simple traversal underneath network address translators server over the transmission control protocol, to request the simple traversal underneath network address translators server over the transmission control protocol to set the destination of the port to the address and port of a home agent or a virtual private network gateway corresponding to the network element, and to receive from the simple traversal underneath network address translators server over the transmission control protocol a response setting the active destination accordingly.

The registration unit may be further configured to send the message for requesting internet protocol registration over the transmission control protocol to a simple traversal underneath network address translators server, and to receive a registration reply message from the simple traversal underneath network address translators server over the transmission control protocol.

The network element may further comprise a decision unit configured to decide to change data packet traffic between a connection based on the transmission control protocol and a connection based on the user datagram protocol.

The configuration may be such that the internet protocol is a mobile internet protocol.

According to a second aspect of the present invention, the above is accomplished by a communication method, comprising requesting by a network element from a server over the transmission control protocol the allocation of a user datagram protocol port having a destination determined to take care of traffic for the network element; allocating the user datagram protocol port having a destination determined to take care of traffic for the network element by the server to the network element over the transmission control protocol; sending an internet protocol registration request from the network element to the server over the transmission control protocol; relaying the internet protocol registration request by the server to the destination determined to take care of traffic for the network element over the user datagram protocol; sending an internet protocol registration reply from the destination determined to take care of traffic for the network element to the server over the user datagram protocol; and relaying the internet protocol registration reply by the server to the network element over the transmission control protocol.

Advantageous modifications of the second aspect may be as follows.

The destination determined to take care of traffic for the network element may be a home agent or a virtual private network gateway.

The method according may further comprise receiving data packets for the network element over the user datagram protocol by the destination determined to take care of traffic for the network element; forwarding the data packets by the destination determined to take care of traffic for the network element over the user datagram protocol to the server; and relaying the data packets by the server to the network element over the transmission control protocol.

The method may still further comprise sending an internet protocol registration request from the network element over the user datagram protocol to the destination determined to take care of traffic for the network element; and sending an internet protocol registration reply from the destination determined to take care of traffic for the network element over the user datagram protocol to the network element.

The internet protocol may be a mobile internet protocol.

According to a third aspect of the present invention, the above is accomplished by a computer program product embodied on a computer-readable medium, the computer program product configured to provide instructions to carry out a method according to the second aspect of the present invention or any of its modifications.

According to a forth aspect of the present invention, the above is accomplished by a network element, comprising means for requesting from a server over the transmission control protocol the allocation of a user datagram protocol port having a destination determined to take care of traffic for the network element; and means for creating a message for requesting internet protocol registration and for sending the message over the transmission control protocol.

Thus, embodiments of the present invention may be considered as advantageous variation of the third and second implementation examples described above.

Further, according to embodiments of the present invention, instead of using a notification agent with knowledge of Mobile IP and IPsec/IKE signaling messages, STUN (Simple Traversal Underneath NAT) Relay Usage (also known as "TURN") as specified in document Jonathan Rosenberg et al.: "Obtaining Relay Addresses from Simple Traversal Underneath NAT (STUN)", work in progress, IETF Internet-Draft draft-ietf-behave-turn-03, March 2007, is used.

The mobile node/VPN client uses the STUN protocol to communicate with a general-purpose STUN server, which does not have to be able to observe other Mobile IP or IPsec/IKE signaling messages.

This solution proposal does not require modifications or standardization effort to the home agent or VPN gateway nor to Mobile IP/IKE protocols. The STUN server can either be a separate network element, or could be co-located with the home agent/VPN gateway.

Other objects, features advantages and details will become more readily apparent from the following detailed description of embodiments of the present invention which is to be taken in conjunction with the appended drawing, in which:

FIG. 1 shows a signaling diagram depicting an embodiment of the present invention.

In the following, embodiments of the present invention are described by referring to particular implementation details. It is however to be understood that the present invention is not intended to be limited to these implementation details.

EMBODIMENT 1

Mobile IPv4

In the following, a first embodiment represented by the application of the present invention to an implementation using Mobile IPv4 is described by referring to FIG. 1.

FIG. 1 depicts a situation underlying embodiment 1 of the present invention, where a mobile node is placed behind a network address translator (NAT) and uses the relay mechanism of a STUN server for interaction with a home agent (or another correspondent node).

Initially, the mobile node registers its care-of address with the home agent as usual and sends UDP keep-alive messages, as specified in documents RFC3344 and RFC3519 of the IETF. The STUN server is not involved in this protocol interaction.

When the mobile node determines that the connection has been idle for some time, it does the following:

The mobile node contacts the STUN server over TCP (step 1). Then, the mobile node requests the STUN server to allocate a UDP port (preferably with a long lifetime), and sets its destination to the home agent's address and port 434 (for Mobile IPv4). This corresponds to Allocate Request/Response and Set Active Destination Request/Response messages (step 2).

It is to be noted here that although the above process is presently preferred, in STUN, the destination (home agent's/VPN gateway's IP address and port) can be given either once (using the STUN Set Active Destination Request message as shown in FIG. 1), or separately each time a packet is sent (e.g. together with the MIP Registration Request). The latter alternative may bring about some overhead in every packet, but regarding other advantages, it is deemed to work equally fine.

Afterwards, the mobile node creates a Mobile IPv4 Registration Request message, and sends it over the TCP connection to the STUN server. The STUN server will forward it over UDP to the home agent (step 3).

The home agent will see a Registration Request message coming from the STUN server's IP address, processes it as usual, and replies with Registration Reply message. The STUN server will relay the Registration Reply message to the mobile node over the TCP connection (step 4).

When the mobile node receives the reply, it will stop sending UDP keep-alive messages and enters what may be called an "idle mode" (step 5).

At this point, some amount of time may elapse without the mobile nodes needing to send keep-alive messages. During this time, the mobile node may have to (step 6): refresh the port allocation in the STUN server by sending Allocate Request messages before its lifetime determined by LIFETIME attribute in Allocation Response message expires; send something to the STUN server to refresh the TCP connection state in any NATs/firewalls between the mobile node and the STUN server; and/or send Registration Request messages to the home agent to refresh the mobility binding before it expires as determined by the lifetime field in Registration Reply message.

The key point here is that these procedures need to be performed once in 10 . . . 30 minutes versus 20 . . . 40 seconds with ordinary Mobile IP NAT traversal.

When the home agent receives a packet destined to the mobile node, it will send it over UDP to the STUN server's address. The STUN server will then forward it to the mobile node over TCP (step 7*a*). Alternatively, leaving the idle mode can also occur because the mobile node has traffic it wants to send (step 7*b*).

In any way, the mobile node re-registers with the home agent directly via UDP, i.e. not going via the STUN server. When the home agent has processed this request, all further data traffic is sent directly over UDP instead of going via the STUN server (step 8).

When the connection becomes again idle, the procedure again starts from the beginning.

Described below are further embodiments of the present invention by referring the other implementation examples.

The description is made by explaining the differences to embodiment and to thus omit any repetitions for a comprehensive illustration of the embodiments.

EMBODIMENT 2

IPsec with MOBIKE

MOBIKE refers to the IKEv2 Mobility and Multihoming Protocol (MOBIKE) as specified in document RFC 4555 of the IETF (IKE=internet key exchange).

In accordance with the present embodiment, the invention is equally applicable to IPsec VPNs. The differences are as follows:

In step 2, the destination is the VPN gateway's address and the port is 4500 (IPsec NAT traversal).

In steps 3 to 5, IKE Informational Request message (with UPDATE_SA_ADDRESSES payload) and the corresponding response message are used instead of Mobile IPv4 Registration Request/Reply messages.

In step 6, during this time, the VPN client may have to respond to Dead Peer Detection messages sent by the VPN gateway. These do not trigger transition away from idle mode.

In step 8, IKE Informational Request message (with UPDATE_SA_ADDRESSES payload) and the corresponding response message are used instead of Mobile IPv4 Registration Request/Reply.

EMBODIMENT 3

IPsec without MOBIKE

In accordance with the present embodiment, the present invention can also be applied without MOBIKE. In this case, the VPN gateway has to implement the optional feature as defined in document RFC4306 of the IETF: "hosts that are not behind a NAT SHOULD send all packets (including retransmission packets) to the IP address and port from the last valid authenticated packet from the other end (i.e., dynamically update the address)". Any IKE Request/Response message or authenticated ESP packet can be used instead of the UPDATE_SA_ADDRESSES payload.

EMBODIMENT 4

Dual-Stack Mobile IPv4

Dual-Stack Mobile IPv4 defines extensions that allow a node that has IPv4 and IPv6 addresses to maintain communications with any of its addresses while moving in IPv4 or dual stack networks.

It therefore separates the Mobile IPv4 signaling from the IP version of the traffic it tunnels. Mobile IPv4 with the present extensions remains a signaling protocol that runs over IPv4, and yet can set-up any combination of IPv4 and/or IPv6 over IPv4 tunnels.

Thus, the description of embodiment 1 equally applies to Dual-Stack Mobile IPv4.

EMBODIMENT 5

Dual-Stack Mobile IPv6

Unlike Mobile IPv4, Mobile IPv6 does not use UDP to carry MIPv6 signaling messages. Therefore, it does not usually work through NATs or stateful firewalls.

However, Dual-Stack Mobile IPv6 introduces a UDP encapsulation for Mobile IPv6, to which the present invention can be applied in accordance with the present embodiment.

Dual-stack Mobile IPv6 introduces UDP encapsulation for mobility signaling messages and for encapsulation of the data traffic. Therefore, the description of embodiment 1 can be applied with the following differences:

In step 2, the port number is different (not yet specified in the current Dual-Stack Mobile IPv6 draft).

In steps 3 to 5 and 8, Mobile IPv6 Binding Update/Binding Acknowledgement messages are used instead of Mobile IPv4 Registration Request/Reply messages.

In step 6, during this time, the mobile node may have to process Mobile Prefix Advertisement messages, and if IPsec is used to protect Mobile IPv6 signaling messages, IPsec/IKE Dead Peer Detection messages.

EMBODIMENT 6

Co-Located STUN Server

The previous embodiments have assumed that the STUN server is a separate network element. In some cases, it may be advantageous to implement the STUN server functionality on the same physical box as e.g. a home agent or a VPN gateway. This enables the following optimizations:

If the mobile node/VPN client knows that STUN server functionality is implemented in the same node, STUN server discovery procedures can be skipped, since the mobile node/VPN client already knows the home agent/VPN gateway address).

The key for calculating STUN MESSAGE-INTEGRITY attribute could be derived from already existing key material between the mobile node/VPN client and home agent/VPN gateway. For example, in the case of Mobile IPv4, the key could be derived from the mobile node-home agent key.

The embodiments of the present invention achieve the following advantages. The amount of keep-alive messages is reduced significantly which leads to big savings in mobile device power consumption and thus improved battery lifetime and user satisfaction. Furthermore, it does not require any modifications to NATs or firewalls. In addition, the embodiments of the present invention also do not require any modifications to Mobile IPv4 or IPsec protocols, Mobile IPv4 home agents, or IPsec VPN gateways.

An implementation of embodiments of the present invention may be achieved by providing a computer program product embodied as a computer readable medium which stores instructions according to the above described embodiments.

Thus, what is described above is a network element, method and computer program product enabling to reduce the need to send keep-alive messages when elements have to be traversed. Specifically, a network element comprises a port allocation request unit configured to request from a server over the transmission control protocol the allocation of a user datagram protocol port having a destination determined to take care of traffic for the network element; and a registration unit configured to create a message for requesting internet protocol registration and to send the message over the transmission control protocol.

What has been described above is what is presently considered to be preferred embodiments of the present invention. However, as is apparent to the skilled reader, these are provided for illustrative purposes only and are in no way intended to that the present invention is restricted thereto. Rather, it is the intention that all variations and modifications be included which fall within the spirit and scope of the appended claims.

The invention claimed is:

1. A network element, comprising:
a port allocation request unit configured to request from a server over a transmission control protocol (TCP) connection an allocation of a user datagram protocol (UDP) port having a destination determined to take care of traffic for the network element; and
a registration unit configured to create a message for requesting internet protocol (IP) registration and to send the message over the TCP connection via the server, wherein the server comprises a simple traversal underneath network address translators (STUN) server; and
wherein the port allocation request unit is further configured to
request the server over the TCP connection to set an active destination of the UDP port to the address and the port of the destination determined to take care of traffic for the network element; and
receive from the server over the TCP connection a response setting the active destination accordingly.

2. The network element according to claim 1, wherein the port allocation request unit is further configured to receive a UDP port allocation response from the server over the TCP connection, and wherein the destination determined to take care of traffic for the network element is a home agent or a virtual private network gateway.

3. The network element according to claim 1, wherein the registration unit is further configured to send the message for requesting internet protocol registration over the transmission control protocol to the server, and to receive a registration reply message from the server over the transmission control protocol.

4. The network element according to claim 3, further comprising a sending unit configured to regularly send a keepalive message to the user datagram protocol port.

5. The network element according to claim 4, wherein the sending unit will stop sending the keepalive message when the registration unit has received the registration reply response from the server.

6. The network element according to claim 1, further comprising a decision unit configured to decide to change data packet traffic between a connection based on the transmission control protocol and a connection based on the user datagram protocol.

7. The network element according to claim 1, wherein the internet protocol is a mobile internet protocol.

8. The network element according to claim 1, wherein the network element is a mobile device.

9. A communication method, comprising:
requesting by a network element from a server over a transmission control protocol (TCP) connection an allocation of a user datagram protocol (UDP) port having a destination determined to take care of traffic for the network element;
allocating the UDP port having the destination determined to take care of traffic for the network element by the server to the network element over the TCP connection;
sending a request to the server over the TCP connection to set an active destination of the UDP port to the address and the port of the destination determined to take care of traffic for the network element;
receiving from the server over the TCP connection a response setting the active destination accordingly;
sending an internet protocol (IP) registration request from the network element to the server over the TCP connection;

relaying the IP registration request by the server to the destination determined to take care of traffic for the network element over the UDP port;

sending an IP registration reply from the destination determined to take care of traffic for the network element to the server over the user datagram protocol; and relaying the IP registration reply by the server to the network element over the TCP connection, wherein the server comprises a simple traversal underneath network address translators (STUN) server.

10. The method according to claim 9, wherein the destination determined to take care of traffic for the network element is a home agent or a virtual private network gateway.

11. The method according to claim 9, further comprising:
receiving data packets for the network element over the user datagram protocol by the destination determined to take care of traffic for the network element;
forwarding the data packets by the destination determined to take care of traffic for the network element over the user datagram protocol to the server; and
relaying the data packets by the server to the network element over the transmission control protocol.

12. The method according to claim 9, further comprising:
sending an internet protocol registration request from the network element over the user datagram protocol to the destination determined to take care of traffic for the network element; and
sending an internet protocol registration reply from the destination determined to take care of traffic for the network element over the user datagram protocol to the network element.

13. The method according to claim 9, wherein the internet protocol is a mobile internet protocol.

14. A computer program product embodied on a non-transitory computer-readable medium, the computer program product contains instructions, when executed by a processor, to carry out a method according to claim 9.

15. The method according to claim 9, further comprising:
sending a keepalive message regularly to the user datagram protocol port.

16. The method according to claim 15, wherein the sending of the keepalive message will stop when the internet protocol registration reply response has been received from the server.

17. A method, comprising:
requesting, from a server over a transmission control protocol (TCP) connection, an allocation of a user datagram protocol (UDP) port having a destination determined to take care of traffic for the network element;
creating a message for requesting internet protocol (IP) registration and sending the message over the TCP connection via the server, wherein the server comprises a simple traversal underneath network address translators (STUN) server;
requesting the server over the TCP connection to set an active destination of the UDP port to the address and the port of the destination determined to take care of traffic for the network element; and
receiving from the server over the TCP connection a response setting the active destination accordingly.

18. The method according to claim 17, further comprising receiving a UDP port allocation response from the server over the TCP connection, and wherein the destination determined to take care of traffic for the network element is a home agent or a virtual private network gateway.

19. The method according to claim 17, further comprising:
sending the message for requesting internet protocol registration over the transmission control protocol to the server, and receiving a registration reply message from the server over the transmission control protocol.

20. The method according to claim 17, further comprising deciding to change data packet traffic between a connection based on the transmission control protocol and a connection based on the user datagram protocol.

21. The method according to claim 17, wherein the internet protocol is a mobile internet protocol.

22. The method according to claim 17, wherein the method is performed by a mobile device.

* * * * *